(12) United States Patent
Moulsley

(10) Patent No.: US 6,556,585 B1
(45) Date of Patent: Apr. 29, 2003

(54) METHOD OF CONTROLLING A COMMUNICATION SYSTEM AND THE SYSTEM EMPLOYING THE METHOD

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/294,863

(22) Filed: Apr. 20, 1999

(30) Foreign Application Priority Data

Apr. 25, 1998 (GB) ............................................. 9808716

(51) Int. Cl.⁷ ................................................. H04J 3/16
(52) U.S. Cl. ........................ 370/465; 370/347; 370/470
(58) Field of Search ................................ 370/464, 465, 370/467, 470, 347, 310.1, 310.2, 312, 321, 328, 329, 315, 330, 331, 332, 333, 336, 337, 348, 442, 443, 478, 474, 455, 504–506; 455/33.1, 69

(56) References Cited

U.S. PATENT DOCUMENTS 5,175,867 A * 12/1992 Wejke et al. ............... 455/33.1
5,194,873 A * 3/1993 Sickles, II .................. 342/374
5,818,829 A * 10/1998 Raith et al. ................. 370/347
5,930,684 A * 7/1999 Keskitalo et al. ............. 455/69

FOREIGN PATENT DOCUMENTS

| SE | WO94/29981 | * 12/1994 | |
| WO | WO 9429981 | 12/1994 | ............ H04J/13/00 |

* cited by examiner

*Primary Examiner*—Dang Ton
*Assistant Examiner*—Robert W. Wilson
(74) *Attorney, Agent, or Firm*—Michael Schmitt

(57) ABSTRACT

A method is described of controlling a communication system using a continuous FDD channel. Each time segment of the channel is divided into a predetermined number of sub-segments. For a first set of time segments, the communication signal data for the respective time segment is repeated in all sub-segments, and for a second set of time segments, null periods are provided in one or more of the sub-segments during which the communication signal from the first station to the second station is interrupted. The communication signal data is transmitted during the remaining sub-segments of the second set. This approach enables a slotted transmission mode to be established in a CDMA FDD system, without the need to adapt the spreading ratio of the CDMA system.

9 Claims, 2 Drawing Sheets

METHOD OF CONTROLLING A COMMUNICATION SYSTEM AND THE SYSTEM EMPLOYING THE METHOD

FIELD OF THE INVENTION

This invention relates to a method of controlling a communication system, and particularly to enable interrogation of other channels in a radio system so that a handover request may be generated. In particular, the invention is concerned with handover from an established channel operating in a frequency

BACKGROUND

The need for handover control in cellular systems is well known, and many techniques for changing the base station with which a mobile unit is communicating have been proposed. The present invention is particularly concerned with the handover of communication signals between different systems, or within a single system which supports more than one frequency channel or different types of communication in different areas.

For a mobile station to determine when handover is appropriate, some monitoring must be made of alternative available channels so that a correct handover decision can be made. A particular problem arises if an existing communication channel is operating in a CDMA frequency division duplex (FDD) mode, because user data is assigned to virtually the full duration of each time frame of the communication channel, so that there is no available time for the mobile station to monitor alternative communication channels. One possible solution to this problem is to provide each mobile station with two receivers, one for receiving the user data transmitted by the base station, and the other for monitoring the condition of other possible channels. It is, of course, desirable to avoid the need for each mobile station to have two receivers.

An alternative approach is to provide a slotted transmission mode in which for some or all time frames, the base station transmits all of the data for the frame, but in part of the frame duration. This would normally require that the information rate is increased during transmission, for example by reducing the spreading factor in a spread spectrum system. No information is sent to the mobile station during the remainder of the frame, which comprises a null period. There could be information sent in the null period, but of a nature which can be ignored by the mobile station. The null periods enable the mobile station to use a single receiver to perform signal measurements during the null periods in order to analyse alternative channels or frequency bands. This analysis then enables evaluation of whether handover is appropriate.

WO 94/29981 discloses a transmission system for handover in DSCDMA systems, in which idle periods are provided in the otherwise continuous transmission. In a time frame having an idle period, the transmission of the channel data in the time frame is carried out with a higher transmission power, and with a lower spreading ratio. The idle periods enable other channels to be monitored by the mobile station to enable seamless handover.

A problem with the system of WO 94/29981 is the need to dynamically alter the spreading ratio of the CDMA coding. A further problem may arise concerning the timing of the idle periods.

For example, in order to evaluate whether an alternative channel is appropriate for handover, the mobile station needs to obtain information concerning other channels, which information may be transmitted only at specific times. For example control data defining a channel may be provided at an allocated timing within each time frame, for example in the header of each time frame. A system operating using time division duplex (TDD) will only produce base station transmissions during a fraction of the time slots in a time frame. Therefore, for the mobile station to evaluate whether an alternative possible channel is appropriate, it needs to interrogate alternative channels at specific but unknown times.

A particular problem may arise if the time frame duration of the alternative channel is the same as the time frame duration of the channel being operated, because the null periods during which the mobile station interrogates alternative channels may not correspond with the control data which is required to make a handover decision.

SUMMARY OF THE INVENTION

According to the preset invention there is provided a method of controlling a communication system in which a communication signal is established between first and second stations and using a channel configuration comprising sequential time segments with the channel defining a substantially continuous transmission, comprising:

dividing each time segment of the channel from the first to the second station into a predetermined number of sub-segments;

for a first set of time segments, repeating the communication signal data for a respective time segment in all sub-segments; and for a second set of time segments, providing in one or more of the sub-segments null periods during which the communication signal from the first station to the second station is interrupted, and transmitting the communication signal data during the remaining sub-segments of the second set.

The use of some sub-segments as null periods enables the transmitter of the first station and/or the receiver of the second station to be used for other purposes, for example for establishing handover. The first station may be the mobile or the base station, and correspondingly the second station may be the base or the mobile station. The time segments preferably comprise time frames. The use of a segmented time frame structure, even for time frames in which no null periods are provided, enables a constant spreading factor to be applied in the case of a code division transmission system. However, for time frames with repeated data (at high bit rate), the data can be combined by the receiving terminal with little or no increase in error occurrence compared to a conventional lower bit rate transmission. Of course, the bit rate of the signal for transmission does not necessarily need to be constant, for example considering variable rate speech codecs.

The transmission during the at least some of the remaining sub-segments for each time segment in the second set may be performed with an increased transmission power, so that the received signal has comparable error characteristics.

Null periods are preferably also provided in a channel from the second to the first station, some of which may be synchronised with null periods in the channel from the first to the second station. This will minimise interference during handover channel monitoring.

The second station may be operated to survey alternative communication channels during the null periods, and to generate a handover request in response to the survey, if a more appropriate channel is identified during the survey. The null periods may be provided in different sub-segments for different time segments in the second set. This overcomes the problem that the null period may repeatedly miss the required data portion of alternative channels being monitored for handover.

The invention also provides a telecommunication system employing a method as described above.

The invention further provides a telecommunication station for transmitting a signal over an allocated channel which is divided into time segments, comprising transmitting means, timing means for dividing the time segments into sub-segments, repeating means for allocating communication signal data to a plurality of sub-segments, and interrupting means for arranging one or more sub-segments as null periods during which transmission is interrupted, wherein for a first set of time segments the repeating means allocates the communication signal data to all sub-segments for transmission at a first power, and wherein for a second set of time segments the interrupting means arranges one or more sub segments of each time segment as a null period and the repeating means allocates the communication signal data to the remaining sub-segments of the second set for transmission at a second power which is greater than the first power.

This transmission station is thus capable of operating according to the method of the invention. The signal for transmission is preferably spread by a code sequence, and wherein the same spreading factor is applied to time segments having sub-segments arranged as null periods as to time segments in which no sub-segments are arranged as null periods.

The invention additionally provides a telecommunication station for receiving a signal from a transmitting station over an allocated channel which is divided into time segments with the time segments divided into a predetermined number of sub-segments, comprising receiving means, means for interrupting operation of the receiving means during sub-segments arranged as null periods, means for combining data in sub-segments arranged as repeated data of individual time segments, and means for operating the receiving means to survey other communication channels during the null periods.

This telecommunication station is thus capable of operating according to the method of the invention. The telecommunication station preferably further comprises de-spreading means which utilises the same spreading factor for time segments having sub-segments arranged as null periods as for time segments in which no sub-segments are arranged as null periods.

BRIEF DESCRIPTION OF DRAWINGS

The invention will now be described by way of example, with reference to and as shown in the accompanying drawings, in which.

DETAILED DESCRIPTION

FIG. 1 Part A shows one possible frame structure for the down-link communication between a base station and a mobile station. The signal comprises a number of time frames 2 arranged in sequence. Typically, a time frame may have a duration of 10 ms. Each time frame 2 includes user data as well as control data. The user data and control data may be multiplexed together, or else each time frame may be divided into discrete sections, or each may be carried on a separate physical channel. For example, each time frame may include a synchronisation sequence and a header in which control data is transmitted. This invention is particularly concerned with a communication system employing frequency division duplex, in which the transmission and reception signals are essentially continuous. Of course, various coding and interleaving techniques are additionally possible. The invention is directed at the particular problem of handover from a frequency division duplex system to other frequencies, to alternative systems, or to other modes of communication supported by an individual system.

In order to make reliable handovers possible, it is necessary for the mobile station to make measurements of the potential replacement channels established by other base stations (or even by the same base station). For seamless handover to take place, these measurements must be carried out by the mobile station while the existing connection is maintained. This requires the mobile station to have a second receiver for monitoring alternative channels, or else requires the mobile station to interrupt use of its single receiver periodically. For this purpose, null periods 4 are possible in the transmission from the base station to the mobile station during which time the mobile station receiver can be allocated to tasks other than reception of information from the base station. One possible arrangement of the null periods 4 is shown in FIG. 1A, in which each null period 4 occupies approximately half of the frame duration, and is positioned at the beginning of a time frame 2 with a null period for every fourth time frame.

Although in the example above, and in the following examples, a null period is associated with a respective time frame, and the null period has a duration shorter than a time frame, other configurations are possible. For example, the null period may be as long as or longer than the time frame duration of the system. The time segments will then comprise a number of time frames.

Figure 1A:
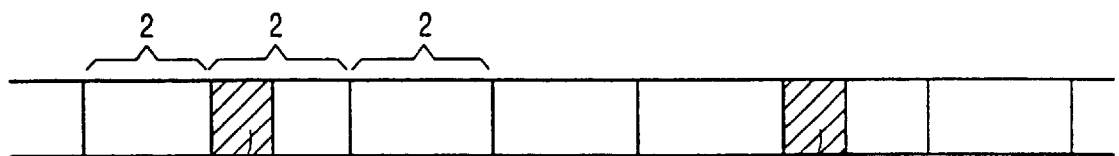
FIG. 1 shows frame timing data using one possible slotted transmission. mode.

If the configuration shown in FIG. 1A is to be adopted, measures need to be taken to ensure that the communication signal data for the time frame can be sent despite the reduced time available as a result of the null period. This requires an increased signal bit rate. In the case of a spread spectrum system (for example Code Division Multiple Access— CDMA) this requires the transmission to be performed with a reduced spreading factor. The spreading factor is normally defined as the ratio between the chip rate of the spreading sequence and the information bit rate. Therefore, a change in the bit rate requires a change in spreading factor. The means of achieving this depends upon the particular system, but could require changing the spreading code, or use of multiple spreading codes.

This dynamic control of the spreading factor, both at the transmitting and receiving terminal, may introduce additional complexity into the system hardware and software. It may also require re-allocation of system resources (i.e. spreading codes) between users. It is also known that the transmission power can be increased for higher bit rate transmissions to maintain the effective signal to noise ratio at the receiver.

Figure 1B:
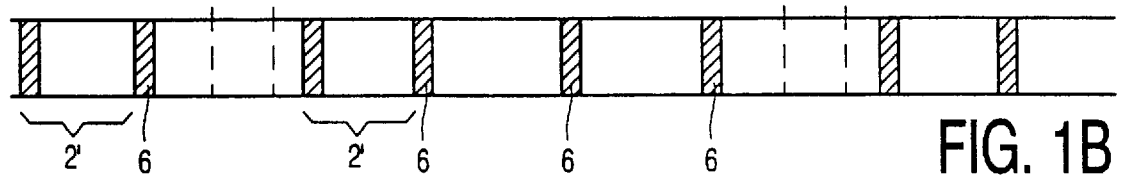

A further possible problem with the base station transmission of FIG. 1A arises if the monitoring by the mobile station during the null periods 4 does not coincide with control information transmitted by other base stations. In this case, the null periods 4 may coincide with a period during which other base stations make no transmissions. For example, FIG. 1B shows a possible frame structure for a different base station which operates using time frames 2' of the same duration. The bold lines in FIG. 1B at the beginning of each time frame 2' represent control data portions 6 of each time frame, during which the base station may be set up to transmit various items of control information, such as identification of the base station, information concerning which alternative systems are authorised to use the channel, and the type of signal transmissions which the base station can support. The null periods 4 of FIG. 1A do not coincide with any of the control data portions 6 so that the mobile station will not receive any of the control information required to determine whether it may be appropriate to handover to the base station using the channel represented in FIG. 1B.

This particular problem mayarise with unsynchronised systems having the same frame duration, or it may equally arise in a single system which supports different communication modes. For example in the proposed UMTS system, there are proposals for the system to support a frequency division duplex mode as well as a time division duplex mode. In this case, the channel represented in FIG. 1B may comprise a time division duplex channel offered by a different base station within the UMTS system, or even by the same base station. In this case, the null period must coincide with a period of base station transmission in the TDD system for measurements to be possible by the mobile.

Figure 2A:
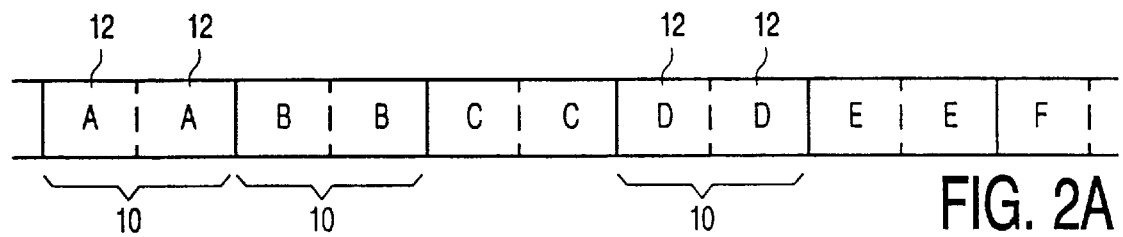
FIG. 2 shows frame timing diagrams for operation in accordance with the invention.

FIG. 2A shows one possible frame structure for use in the method of the invention. In FIG. 2A, only time frames 10 which are fully occupied with channel data are shown. Each frame 10 is divided into two sub-segments 12, each of which contains the same channel data. The channel data is represented by the letters A, B, C, D, E and F. Thus, the channel data is transmitted by the transmitting station at a higher bit rate than is required (thereby reducing the error rate) but the information is repeated. The method in accordance with the present invention could also be applied independently to control data and to user data, and need not be applied to all the data. For example, there would normally be no benefit in repeating power control information, but there could be some benefit in repeating rate or transport format information.

The channel data in FIG. 2A may comprise user data or control data or both. Multicode transmission is a known technique for use in UMTS implementations. In this case different frame structures may apply to such transmissions which can use different spreading codes for different portions of the data. (Spreading codes in UMTS can be considered as the combination of a scrambling code and a channelisation code.) Thus the frame structure in FIG. 2A may be used in combination with other frame structures which do not use the sub-segments approach of the present invention.

With suitable combination techniques, the same received signal quality can be obtained. This may be achieved by combining soft decision information for each repeated data bit (or modulation symbol).

In a conventional CDMA system, information to be transmitted within a frame is coded and spread together with the highest possible spreading factor, so that the spread spectrum information fills the frame. However, in the example of FIG. 2A, the shorter available time for the full channel information for the time frame requires a lower spreading factor.

Figure 2B:
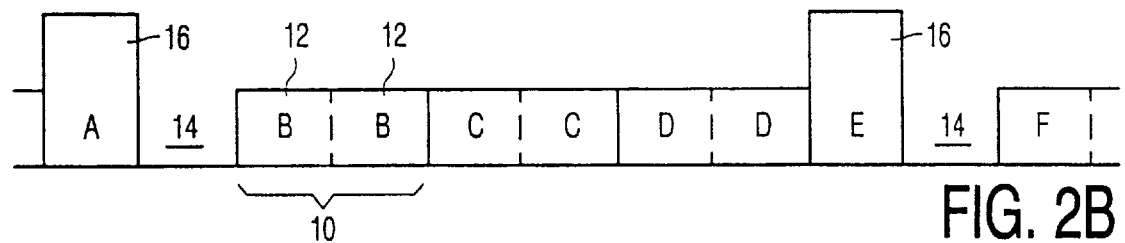
Figure 2C:
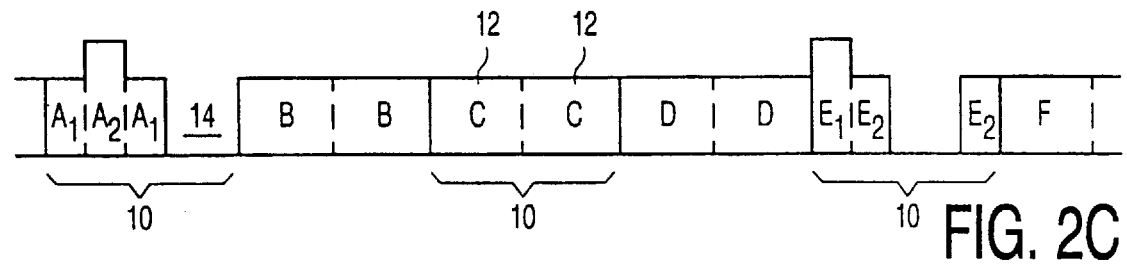

One example of a frame structure according to the invention is shown in FIG. 2B, in which a discontinuous transmission is provided. For some of the time frames 10, one of the two sub-segments 12 is arranged as a null period 14, during which no power is transmitted, so that the transmitter or the receiver of the receiving station may be employed for other purposes. If the frame structure is employed in the down-link signal, the null period 14 enables the mobile station to use its (single) receiver to interrogate other systems to evaluate the need for signal handover. If the frame structure is used in the up-link, the mobile station can use its transmitter for other purposes during the null periods, for example to signal to another system. Within a system of mobile stations and base stations, only some of the mobile stations may need to be allocated a radio bearer having the repeated transmission configuration.

One advantage of the frame structure in this respect is that the transmitting station (whether the mobile or the base station) does not need to notify previously the receiving station that it is providing an interruption in the transmission. A signal may be sent in the pilot portion of the frame structure. The absence of this pilot signal may be used to indicate that a null period is present in that particular time frame, thus little or no process modification would be required by the receiving station to receive information during a time frame which is provided with a null period.

However, for the purposes of handover, the mobile station will require previous knowledge of the timing of the null periods in the down-link signal, so that the mobile station receiver can switch to another frequency for evaluation of another carrier. This may, for example, be achieved by having a predetermined frame arrangement, with regular null periods.

The timing of successive null periods in the down-link transmission may be set to follow a repeating sequence, so that the mobile station can independently calculate when the null periods will arrive. A synchronisation message will be required to initialise a channel set up, which specifies the timing of at least one null period. Alternatively, the mobile may request a specific timing for null periods, for example if one particular timing reveals a greater number of alternative channels to interrogate. This request may be achieved using dedicated signalling. Flexibility for the mobile to select the timing of null periods also enables the mobile to dictate that two or more base stations transmit null periods at the same time, for example in the case that the mobile is receiving user data from two base stations simultaneously. Such an approach may be implemented in some systems to increase diversity.

The timing of the null periods may alternatively be varied by the infrastructure rather than following a predetermined pattern.

The height of the blocks in FIG. 2 representing the channel information is intended to show schematically the required transmission power. As shown, the power is increased for the shorter duration channel data 16 in the time frames having null periods. This improves the signal to noise ratio.

As an alternative, there may be operating configurations for which the signal to noise ratio may be improved without increasing transmission power. For example, in a system which generates discontinuous data streams (for example a variable rate speech or video codec), with the discontinuities occurring within time frames, it may be possible to fill the gaps in the data stream with repetitions of the existing data packets. A discontinuous transmission system (DTX) is known which creates spaces in the time slots of a real-time transmission, giving constant end-to-end delay, with constant bit rate during tranmission periods. These gaps can be filled by repetitions of the existing data at the same bit rate, instead of increasing transmission power.

In FIG. 2B, the two null periods are shown as having the same relative positioning within their respective time frames. However, it may instead be desirable to alter the timing of the null periods within the respective time frames. For handover investigations, this will enable the null period to overlap with different portions of the frames of alternative systems having identical frame durations. This may be required in order to read the relevant part of the time frame of the alternative system. In the example of FIG. 2B, it may be desirable for the first half of some frames to be arranged as a null period, and for the second half of some other frames to be arranged as the null period.

For handover, the down-link signal will have the configuration described. However, the up-link signal from the mobile station to the base station is preferably also arranged to be interrupted with null periods corresponding and coinciding with the null periods 4 of the base station transmission. This enables the mobile station to monitor channels operating in the same or adjacent frequency bands to the channel presently operating. This situation may arise in the UMTS system, in which the TDD and FDD communication modes may be deployed in the adjacent frequency bands. Without switching off the transmitter of the mobile station, high performance filters would be required to prevent the transmission signal from the mobile station interfering with the monitored signals from alternative channels.

Although in FIG. 2B the duty cycle of the channel data period to the null period is 0.5 (which is appropriate for soft handover) other duty cycles may be considered. For example, in FIG. 2C, which again relies upon a frame structure divided into two sub-segments, the null period has a duration of 0.25 of the frame duration. Each frame may then be considered to comprise data repeated twice, and it is useful to consider the data as having two sections. Thus, channel data A comprises data portion $A_1$ and data portion $A_2$. In this case, since the null period only lasts half of the duration of the data, only half of the data needs to be transmitted at increased power, namely data A2 in FIG. 2C. It is again possible to shift the position of the null period in different time frames which are provided with null periods, as shown with data E in FIG. 2C, which comprises data portion $E_1$ and $E_2$.

Figure 2D:
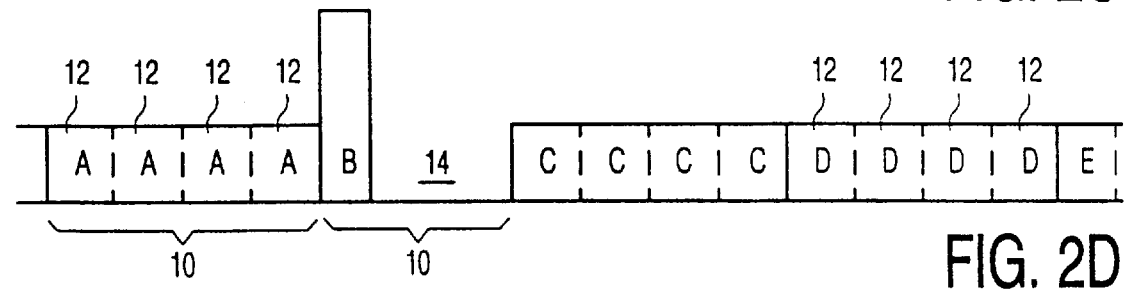

Although the use of two sub-segments has been described, it is equally possible to envisage the use of more sub-segments, for example four as shown in FIG. 2D. In the example shown, channel data B is transmitted only once, at greatly increased power, and the null period 14 has a duration of 0.75 of the frame duration. A lower spreading ratio for a CDMA system operating according to this scheme will be required.

Figure 3:
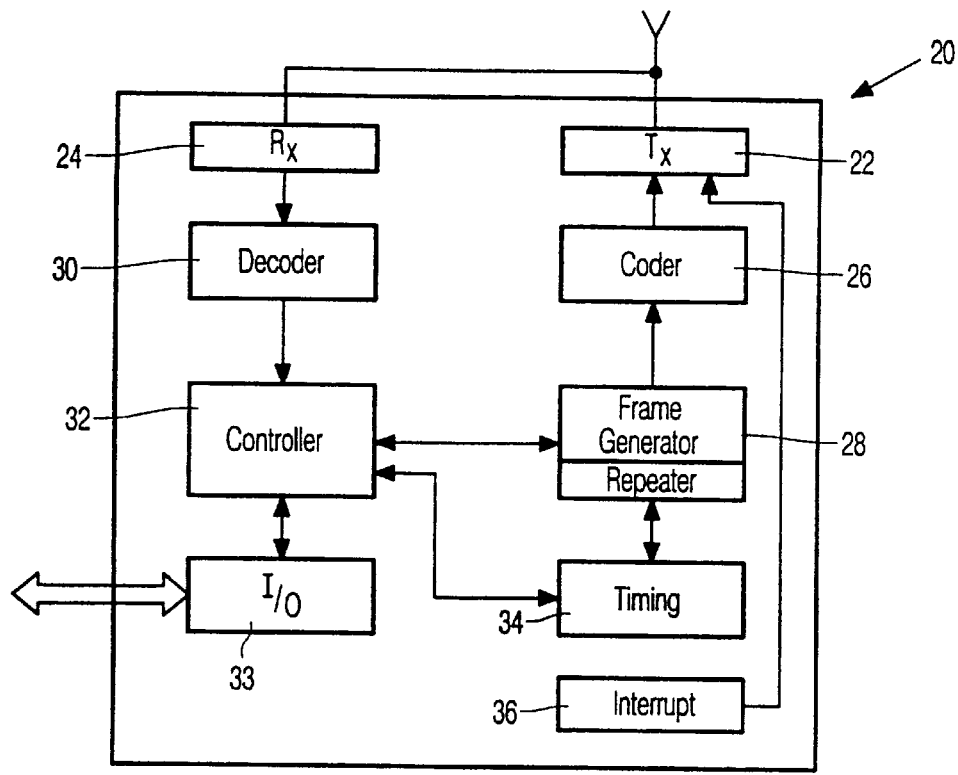
FIG. 3 shows schematically an architecture for a transmitting station capable of operating according to the method of the invention.

FIG. 3 shows, in schematic form, a possible architecture for a transmitting station to generate a channel structure as described with reference to FIG. 2. The station 20 comprises a transmitter 22 and a receiver 24. The signal for transmission is prepared by a coding unit 26 which performs the necessary modulation including any coding (i.e. spreading) or interleaving of the transmitted signals. The frame structure is set by a frame generator 28 including a repeater 30 for repeating the channel data in sub-segments of the time frames. The frame generator 28 also generates the control portion of the frame structure, including headers and synchronisation sources. In addition, the frame generator defines the sub-segments of the time frames.

Similarly, a decoding unit 30 is provided for the received signal. The overall control of the station is governed by a controller 32 which controls the operation of the coder 26, decoder 30 and an input/output interface 33. The station additionally comprises a timing controller 34 which gives information to the system controller 32 to influence the frame generation process, in particular the allocation of null periods to the time frames. For this purpose, a circuit 36 for interrupting transmission is provided for control by the timing controller 34. This architecture enables the method described above to be implemented.

The structure and operation of the hardware required to implement the method of the invention will not be described in further detail, since more specific details will be apparent to those skilled in the art, and the method of the invention can be implemented using conventional equipment.

When the method of the invention is for use to improve handover, the transmitting station will typically be the base station.

Figure 4:
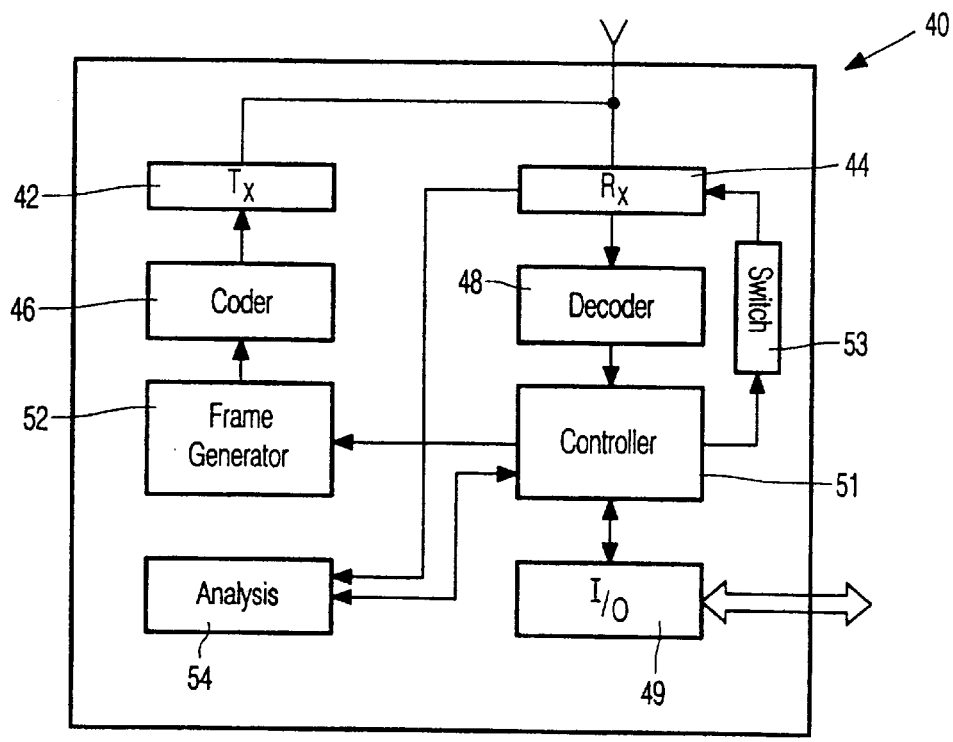
FIG. 4 shows schematically an architecture for a receiving station capable of operating in accordance with the method of the invention.

FIG. 4 schematically shows a possible system architecture for a receiving station which can operate in accordance with the method of the invention. The receiving station 40 again includes a transmitter 42 and a receiver 44 with associated coders and decoders 46, 48 performing the same functions as in the circuit of FIG. 3, and coupled to an input/output circuit 49. The decoder 48 also performs the combination of data in sub-segments arranged as repeated data. The system is again under the control of a controller 51, and for transmission by the receiving station, a frame generator circuit 52 is again provided.

In the station 40 a switch 53 enables the receiver 44 to cease normal operation and to survey other communication channels during the null periods defined in the down-link channel. During this time the receiver 44 provides information to an analysis circuit 54 which provides information to the overall controlling unit 51 which controls the system to generate a handover request in a subsequent up-link transmission.

The controller can also implement the interruption to the transmitted signal from the station 40 corresponding with the null periods in the down-link channel.

Of course, the functions of the receiving station and the transmitting station may be combined in a single device.

Again, more specific details of the possible architecture will not be described, since conventional hardware is appropriate for producing a system operating in accordance with the method of the invention.

I claim:

1. A method of controlling a communication system in which a communication signal is established between a first station and a second station using a channel comprising sequential time segments in a substantially continuous transmission, the method comprising:

dividing each of the time segments into a predetermined number of sub-segments of equal size;

for each time segment of a first set of the time segments, repeating data from the communication signal corresponding to the respective time segment in all sub-segments of the respective time segment; and for each time segment of a second set of the time segments, providing a null period in one or more of the sub-segments of the respective time segment, the communication signal being interrupted during each null period, surveying alternative channels for the communication signal during one or more of the null periods; and transmitting data from the communication signal corresponding to the respective time segment during remaining sub-segments of the respective time segment.

2. A method as claimed in claim 1, wherein the transmission during the remaining sub-segments for each time segment in the second set is performed with an increased transmission power.

3. A method as claimed in claim 1, wherein null periods are also provided in the channel from the second to the first station, and at least some of which are synchronised with null periods in the channel from the first to the second station.

4. A method as claimed in claim 1, wherein the null periods are provided in different sub-segments for different time segments in the second set.

5. A method as claimed in claim 1, wherein the second station generates a handover request in response to surveying alternative channels, if an appropriate channel is identified during the survey.

6. A telecommunication station for transmitting a signal over an allocated channel which is divided into time segments, comprising:

transmitting means, surveying means for surveying alternative channels for the signal;

timing means for dividing the time segments into sub-segments of equal size, repeating means for allocating data from the signal to selected ones of the sub-segments, and interrupting means for arranging one or more of the sub-segments as null periods during which transmission of the signal is interrupted, wherein, for a first set of the time segments, the repeating means allocates the data from the signal to all sub-segments in the first set for transmission at a first power, and wherein, for a second set of time segments, the interrupting means arranges one or more of the sub-segments of each time segment in the second set as a null period, the surveying means surveys the alternative channels during one or more of the null periods; and the repeating means allocates the communication signal data to remaining sub-segments of each time segment in the second set for transmission at a second power which is greater than the first power.

7. A telecommunication station as claimed in claim 6, wherein the signal for transmission is spread by a code sequence, and wherein the same spreading factor is applied to time segments having sub-segments arranged as null periods as to time segments in which no sub-segments are arranged as null periods.

8. A telecommunication station for receiving a signal from a transmitting station over an allocated channel which is divided into time segments with the time segments divided into a predetermined number of sub-segments of equal size, comprising:

receiving means, means for interrupting operation of the receiving means during sub-segments sent from the transmitting station as null periods, means for combining data repeated in multiple sub-segments of individual time segments, and means for operating the receiving means to survey other communication channels for the signal during the null periods.

9. A telecommunication station as claimed in claim 8, further comprising de-spreading means which utilises a same spreading factor for time segments having sub-segments arranged as null periods as for time segments in which no sub-segments are arranged as null periods.

* * * * *